(12) United States Patent
Townsley

(10) Patent No.: US 8,438,779 B2
(45) Date of Patent: *May 14, 2013

(54) INDOOR GREENHOUSE

(75) Inventor: Evan Townsley, Culver City, CA (US)

(73) Assignee: International Growers Supply Incorporated, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,635

(22) Filed: Apr. 30, 2012

(65) Prior Publication Data

US 2012/0210638 A1    Aug. 23, 2012

Related U.S. Application Data

(63) Continuation of application No. 13/180,129, filed on Jul. 11, 2011, now Pat. No. 8,166,700, which is a continuation of application No. 12/917,200, filed on Nov. 1, 2010, now Pat. No. 7,975,428, which is a continuation of application No. 11/682,803, filed on Mar. 6, 2007, now Pat. No. 7,823,324.

(51) Int. Cl.
*A01G 9/00* (2006.01)
(52) U.S. Cl.
USPC .............................................................. 47/17
(58) Field of Classification Search ................. 47/17
See application file for complete search history.

(56) References Cited

U.S. PATENT DOCUMENTS

| | | | |
|---|---|---|---|
| 4,505,066 A | 3/1985 | Moore | |
| 6,267,483 B1 | 7/2001 | Hembery | |
| 6,536,157 B2 | 3/2003 | Wijbenga | |
| 7,823,324 B2 * | 11/2010 | Townsley | 47/17 |
| 8,166,700 B2 * | 5/2012 | Townsley | 47/17 |

OTHER PUBLICATIONS

Jensi Skunk, Die "Hoembox," Kultivierung (magazine), 2005, pp. 40-41, Germany.
Jensi Skunk, Living in a box, Kultivierung (magazine), 2005, pp. 42-45, Germany.
Office Action dated Jan. 21, 2010, issued in related U.S. Appl. No. 11/682,803; cited by other.
Amendment/ Response to Office Action filed Feb. 17, 2010, in response to Office Action dated Jan. 21, 2010, issued in related U.S. Appl. No. 11/682,803; cited by other.
Office Action dated Feb. 3, 2011, issued in related U.S. Appl. No. 12/917,200; cited by other.
Amendment/ Response to Office Action filed Feb. 8, 2011, in response to Office Action dated Feb. 3, 2011, issued in related U.S. Appl. No. 12/917,200; cited by other.

(Continued)

*Primary Examiner* — Kent L Bell
(74) *Attorney, Agent, or Firm* — Jeffer Mangels Butler & Mitchell LLP

(57) ABSTRACT

Described herein is an indoor greenhouse that includes a rack unit, an outer layer that surrounds the rack unit and defines a greenhouse interior, at least one light surrounded by a light enclosure, a cooling system, and a ventilation system all disposed in the greenhouse interior. The ventilation system includes a fan, a filter and at least one duct that cooperate to exhaust air out of the exhaust vent opening. The rack unit includes a top, a bottom, and an intermediate portion extending therebetween. The outer layer includes a top, a bottom, and an intermediate portion extending therebetween that correspond to the similar portions of the rack unit. The outer layer also has intake and exhaust vent and light cooling openings defined therein. The cooling system includes at least one duct that cooperates with the light enclosure to define an air path between the intake and exhaust light cooling openings.

1 Claim, 6 Drawing Sheets

OTHER PUBLICATIONS

Office Action dated Sep. 28, 2011, issued in related U.S. Appl. No. 13/180,129; cited by other.
Amendment/ Response to Office Action filed Dec. 20, 2011, in response to Office Action dated Sep. 28, 2011, issued in related U.S. Appl. No. 13/180,129; cited by other.
"First Growbox", Entries by Various Authors, Published on the Marijuana Passion Forum, Dated Apr. 16-17, 2006.
Winterbone, Jeffrey, "Hydroponics Indoor Horticulture," pp. 67-73, 137-161, and 163-173, Published 2005, Pukka Press Ltd.
GrowingLife, "Home Grow Cabinet Exhibition (Truman Brewery, London)," Publishedon the GrowingLife website, www.growinglife.com, Oct. 2005.
BettergrowHydro, "Ventilation Explained Part 2—Venting Your Lighting Systems,"Published on the BettergrowHydro website, www.bgyodro.com, Aug. 2006.
BettergrowHydro, "Ventilation Explained Part 1—Ventilating Your Growing Area,"Published on the BettergrowHydro website, www.bgyodro.com, Jun. 2006.
"First Time Grow Room Setup", Entries by Various Authors, Published on theGrowroom Setup & Design Forum, Dated May 17-30, 2006.
"Moving from cheap closet to proper grow room . . . ," Various Authors Published on the SeedMine.com Forum at www.buymarijuanaseeds.com, Dated Jun. 30, 2005.
BettergrowHydro, "Build Your Own Hydroponics System Ebb & Flow, Top Feed Drip,"Published on the BettergrowHydro website, www.bgyodro.com, Aug. 2006.
Letter from Philip H. Burrus, IV to Brennan C. Swain, dated Oct. 5, 2012.
Declaration of Steve Sevener, dated Oct. 3, 2012, referenced in item 1 above.
Complaint for Declaratory Judgment, filed on Apr. 9, 2012, in the U.S. District Court for the Northern District of Georgia under Civil Action No. 1:12-cv-1206-CAP.
Plaintiffs Motion to Stay Litigation Pending Reexamination of Defendant's Patent and Brief in Support, filed on Oct. 16, 2012, in the U.S. District Court for the Northern District of Georgia under Civil Action No. 1:12-cv-1206-CAP.
Defendant's Response to Atlantis' Motion to Stay, filed on Nov. 3, 2012, in the U.S. District Court for the Northern District of Georgia under Civil Action No. 1:12-cv-1206-CAP.
Plaintiffs Reply in Further Support of Motion to Stay Litigation Pending Reexamination of Defendant's Patent and Brief in Support, filed on Nov. 19, 2012, in the U.S. District Court for the Northern District of Georgia under Civil Action No. 1:12-cv-1206-CAP.
Joint Preliminary Report and Discovery Plan, filed on Dec. 27, 2012, in the U.S. District Court for the Northern District of Georgia under Civil Action No. 1:12-cv-1206-CAP.
Complaint for Patent Infringement, filed on Apr. 13, 2012, in the U.S. District Court for the Central District of California under Civil Action No. 2:12-cv-03274-SJO-JEM (case transferred on Aug. 8, 2012, to the U.S. District Court for the Northern District of Georgia under Civil Action No. 1:12-cv-2728-CAP).
Defendant the Home Depot, Inc.'s Answer, Affirmative Defenses and Counterclaims, and Demand for Jury Trial, filed on Jun. 7, 2012, in the U.S. District Court for the Central District of California under Civil Action No. 2:12-cv-03274-SJO-JEM (case transferred on Aug. 8, 2012, to the U.S. District Court for the Northern District of Georgia under Civil Action No. 1:12-cv-2728-CAP).
International Growers Supply, Inc.'s Reply to Defendant the Home Depot, Inc.'s Counterclaims, filed on Jun. 28, 2012, in the U.S. District Court for the Central District of California under Civil Action No. 2:12-cv-03274-SJO-JEM (case transferred on Aug. 8, 2012, to the U.S. District Court for the Northern District of Georgia under Civil Action No. 1:12-cv-2728-CAP).
Defendants Atlantis Hydroponics, Inc., Viagrow, LLC, Steven Sevener and Noah D. Hubbard's Answer, Defense and Counterclaims, filed on Sep. 17, 2012, in the U.S. District Court for the Northern District of Georgia, under Civil Action No. 1:12-cv-02728-CAP.
Defendants' Motion to Stay Litigation Pending Reexamination of Plaintiffs Patent and Brief in Support, filed on Oct. 16, 2012, in the U.S. District Court for the Northern District of Georgia, under Civil Action No. 1:12-cv-02728-CAP.
Defendants' Supplemental Brief in Further Support of Their Motion to Stay Litigation Pending Reexamination of Plaintiffs Patent, filed on Nov. 14, 2012, in the U.S. District Court for the Northern District of Georgia, under Civil Action No. 1:12-cv-02728-CAP.
Plaintiffs Motion to Consolidate, filed on Nov. 14, 2012, in the U.S. District Court for the Northern District of Georgia, under Civil Action No. 1:12-cv-02728-CAP.
Joint Preliminary Report and Discovery Plan, filed on Dec. 27, 2012, in the U.S. District Court for the Northern District of Georgia, under Civil Action No. 1:12-cv-02728-CAP.
Order, issued on Jan. 3, 2013, in the U.S. District Court for the Northern District of Georgia, under Civil Action No. 1:12-cv-02728-CAP.
Order, issued on Jan. 3, 2013, in the U.S. District Court for the Northern District of Georgia, under Civil Action No. 1:12-cv-01206-CAP.

* cited by examiner

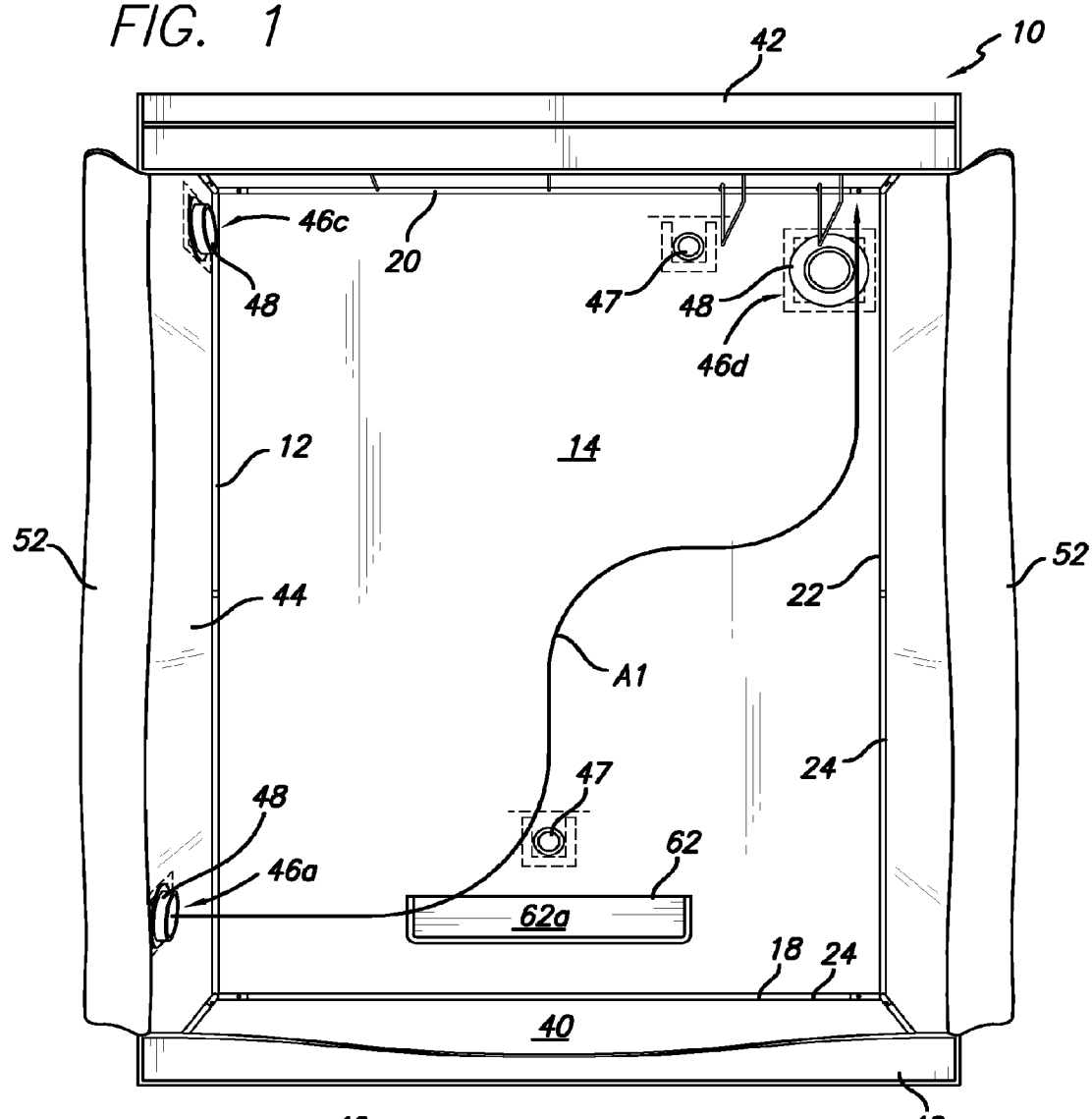
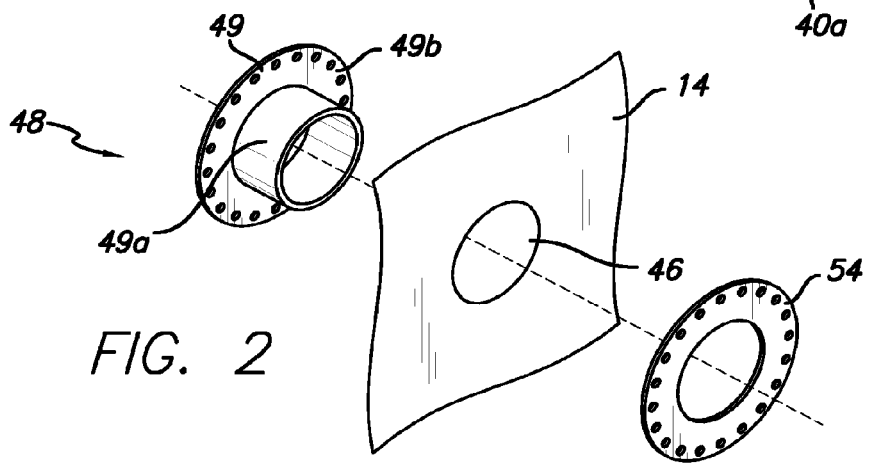

INDOOR GREENHOUSE

This application is a continuation of U.S. patent application Ser. No. 13/180,129 filed on Jul. 11, 2011, which is a continuation of U.S. patent application Ser. No. 12/917,200 filed on Nov. 1, 2010, now U.S. Pat. No. 7,975,428, which is a continuation of U.S. patent application Ser. No. 11/682,803, filed on Mar. 6, 2007, now U.S. Pat. No. 7,823,324, which are incorporated herein in their entireties by this reference.

FIELD OF THE INVENTION

The present invention relates to indoor greenhouses, and more particularly to an indoor greenhouse with a metal frame.

BACKGROUND OF THE INVENTION

In many areas of the world, it is often desirable to raise plants which are not native to the area and which may require a warmer climate than provided in the particular area. It is possible to construct outdoor greenhouses to raise such plants, however, in many climates outdoor greenhouses are impractical and overly expensive for a single family use, due to the severity of the climate, both in terms of temperature, humidity and sunlight. Occasionally it is possible to raise some such plants indoors however, for other plants the temperature and humidity even indoors is not sufficient, and for many plants insufficient sunlight is available indoors. Of course, it is often desirable to have many such plants raised indoors, both for convenience and for the sake of the appearance which many such plants have. Thus, an indoor greenhouse is a useful device.

Most greenhouses are not adapted for indoor use and as a result, take up an undue amount of horizontal space, while wasting vertical space which could not in any event be occupied as a result of the presence of such a structure. As well, greenhouses are usually relatively complex in construction and therefore expensive. As well, most do not make any provision for artificial lighting. In addition, many such prior greenhouses suffer from one or more of the following disadvantages. Such greenhouses often are not readily assembled and disassembled therefore making movement of them difficult, they do not provide easy access to an area throughout the entire greenhouse, and do not provide any simple means by which the entire contents of the greenhouse may be displayed in an almost unobstructed manner when desired.

Accordingly, a need exists for an indoor greenhouse that overcomes the disadvantages discussed above.

SUMMARY OF THE PREFERRED EMBODIMENTS

In accordance with a preferred aspect of the present invention there is provided an indoor greenhouse that includes a rack unit, an outer layer that surrounds the rack unit and defines a greenhouse interior, at least one light surrounded by a light enclosure, a cooling system, and a ventilation system all disposed in the greenhouse interior. The ventilation system includes a fan, a filter and at least one duct that cooperate to exhaust air out of the exhaust vent opening. The rack unit includes a top, a bottom, and an intermediate portion extending therebetween. The outer layer includes a top, a bottom, and an intermediate portion extending therebetween that correspond to the top, bottom, and intermediate portion of the rack unit. The outer layer also has intake and exhaust vent openings and intake and exhaust light cooling openings defined therein. The cooling system includes at least one duct that cooperates with the light enclosure to define an air path between the intake and exhaust light cooling openings.

In a preferred embodiment, the rack unit includes a plurality of poles that cooperate to form the top, bottom and intermediate portions. Preferably, the plurality of poles include at least one pole that has two male ends, at least one pole that has a male end and a double female end, and at least one pole that has a double female end and a single female end.

In another preferred embodiment, the rack unit includes at least four poles and top, bottom and middle shelves, where the shelves are adapted to be disposed at different positions along the length of the poles. In this embodiment, the poles each have a plurality of circumferentially extending grooves defined therein, the bottom and middle shelves are rectangular and each include receptacles at their four corners, the poles include a plurality of generally cylindrical clamps thereon, the clamps have a fin extending around an inner diameter thereof, the fins of each of the clamps are received in a groove, a clamp is associated with each of the receptacles such that a clamp and a portion of one of the poles are received in a receptacle, and the clamp provides a friction fit between the exterior of the clamp and the interior of the receptacle, whereby the shelves are held in place at the desired position on the poles.

In accordance with another aspect of the present invention, there is provided a method that includes providing an indoor greenhouse that includes a rack unit that includes a top, a bottom, and an intermediate portion extending therebetween, and an outer layer that at least partially surrounds the rack unit and defines a greenhouse interior. The outer layer includes a top, a bottom, and an intermediate portion extending therebetween that correspond to the top, bottom, and intermediate portion of the rack unit, and the outer layer has intake and exhaust vent openings and intake and exhaust light cooling openings defined therein. The method further includes placing a light at least partially surrounded by a light enclosure in the greenhouse interior, placing a cooling system that includes first and second ducts and a first fan in the greenhouse interior, arranging the cooling system to define an air path to allow air to travel through the first and second ducts, the first fan, the light enclosure and between the intake and exhaust light cooling openings, and placing a ventilation system in the greenhouse interior. The ventilation system includes a second fan, a filter and at least one duct. The second fan is adapted to move air through the at least one duct and out of the exhaust vent opening.

BRIEF DESCRIPTION OF THE DRAWINGS

FIG. 1 is a front elevational view of an indoor greenhouse with the front flaps open in accordance with a first preferred embodiment of the present invention;

FIG. 2 is an exploded perspective view of a duct connection member, showing how it attaches to a piece of the outer layer of the indoor greenhouse of FIG. 1;

Like numerals refer to like parts throughout the several views of the drawings.

DESCRIPTION OF THE PREFERRED EMBODIMENTS

Figure 3:
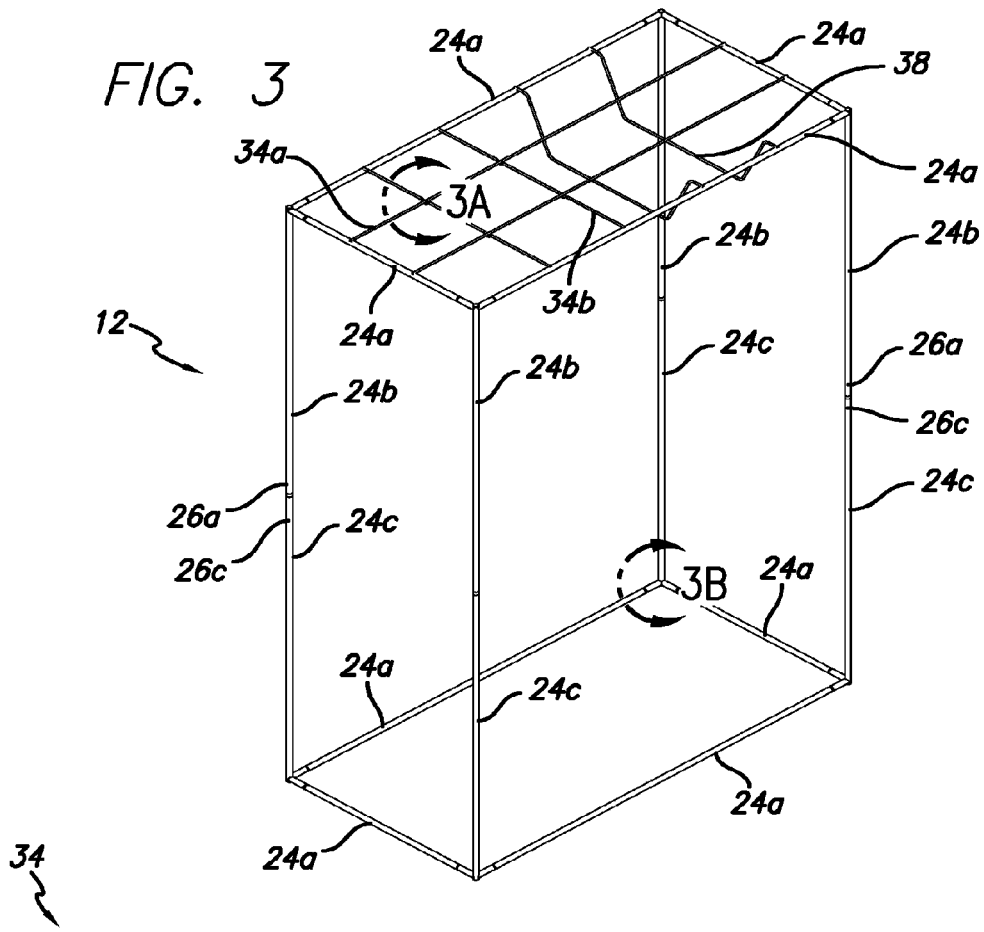
FIG. 3 is a perspective view of the rack unit of the indoor greenhouse of FIG. 1.

As shown in the drawings, for purposes of illustration, the invention is embodied in an indoor greenhouse for growing plants.

It will be appreciated that terms such as "front," "back," "top," "bottom," and "side" used herein are merely for ease of description and refer to the orientation of the components as shown in the figures. It should be understood that any orientation of the indoor greenhouse, and the components thereof described herein is within the scope of the present invention.

Referring to FIGS. 1-3B, generally, a first preferred embodiment of an indoor greenhouse 10 includes a rack unit 12, an outer layer 14 and a ventilation system 16.

Figure 3A:
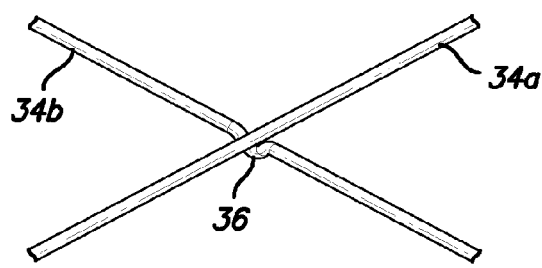
FIG. 3A is a detailed perspective view showing the connection of the top rods of the rack unit of the indoor greenhouse of FIG. 1.
Figure 3B:
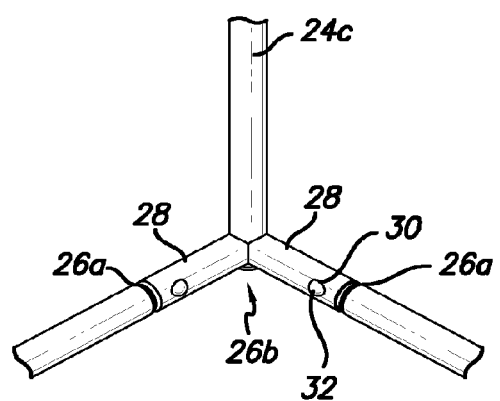
FIG. 3B is a detailed perspective view showing a lower corner of the rack unit of the indoor greenhouse of FIG. 1.

As is best shown in FIG. 3, the rack unit 12 preferably includes a bottom 18, a top 20 and an intermediate portion 22 extending therebetween. The bottom 18, top 20 and intermediate portion 22 each include a plurality of poles 24a, 24b and 24c (the poles in general are all designated generically as 24). The poles designated 24a include two male ends 26a. The poles designated 24b include a male end 26a and a double female end 26b. The poles designated 24c include a double female end 26b and a single female end 26c. The double female end 26b is shown in FIG. 3B and includes two receivers 28 that preferably extend at a about a right angle from each other in the X plane and from the remainder of the pole 24 in the Y and Z planes. The female receivers 28 are adapted to connect with the male ends 26a of other poles 24. In another embodiment, the pole may include more than two receivers or receivers that extend in opposite directions. For example, a pole may include two receivers that extend in opposite directions and a third that extends at a point that is ninety degrees between them. This provides a pole that can be included in the middle of one of the walls of the rack unit.

In a preferred embodiment, the receivers 28 and the remainder of the poles 24 are formed as a unit. This can be done, for example, by welding. This unitary construction makes the corners much stronger than the prior art, which included plastic receivers that were placed on the ends of the poles during construction by a user.

In a preferred embodiment, the receivers 28 include an opening 30 that receives a knob or ball bearing 32 that is biased outwardly by a spring on the male end 26a of a pole 24. When the male end is inserted into the receiver, the knob 32 snaps into the opening 30 and the pole 24 is secured in place. This type of connection can also be used on the intermediate portion 22 to secure to poles 24 together. This type of connection is advantageous over the prior art where the joints between poles were typically taped to prevent the rack unit from coming apart from one another. In other words, the poles were wrapped with tape near the corner connection to prevent the pole from being pulled out of the hole in which it sat.

The type of connection between poles 24 is not a limitation on the present invention and other connections are within the scope of the present invention. For example, in another embodiment, a pole 24 may include a double male end that cooperates with the single female ends 26c of two poles 24. In another embodiment a friction fit may be used between male and female receivers.

The fact that the receivers 28 are already connected to the ends of the poles 24 prior to construction of the rack unit makes the rack unit easy to assembly. This arrangement of poles 24 is a vast improvement over the prior art and greatly cuts down on the time needed to assemble the rack unit. It also shortens the assembly instructions provided to a user of the indoor greenhouse.

The top 20 of the rack unit 12 preferably includes a plurality of rods 34a and 34b (the rods in general are all designated generically as 34). As shown in FIG. 3A, the rods designated 34b include a receptacle portion 36 in which the rods 34a are received. This adds strength to the top 20 when lights are hung from the rods 34a.

The top 20 also preferably includes at least two brackets 38 for affixing the ventilation system 16 (and, in particular, the filter, described below) inside the greenhouse 10. The rods 34 and brackets 38 are preferably secured to the poles 24 by inserting their ends into openings defined in the poles 24. However, the rods 34 can also be secured to the poles 24 by a permanent method, such as welding or the like.

In a preferred embodiment, the rack unit 12 (and the various components thereof) is made of a metal, such as stainless steel. However, this is not a limitation on the present invention. In a preferred embodiment, the rack unit 12 includes metal reinforcement members that extend angularly from one pole 24 to another at the corners. The metal reinforcement members can be rods or a plate (such as a triangular or trapezoidal shaped plate.

It will be understood that any combination of poles 24, 24a, 24b, 24c and ends 26a, 26b and 26c (or double male ends) is within the scope of the present invention. For example, as shown in the figures, in a preferred embodiment, the rack unit 12 includes four poles extending between the top 20 and bottom 18. However, in another embodiment, the rack unit 12 can include six poles extending between the top 20 and bottom 18, thereby making the greenhouse 10 twice as wide. Those skilled in the art will understand that there are numerous ways to construct the rack unit 12.

Figure 4:
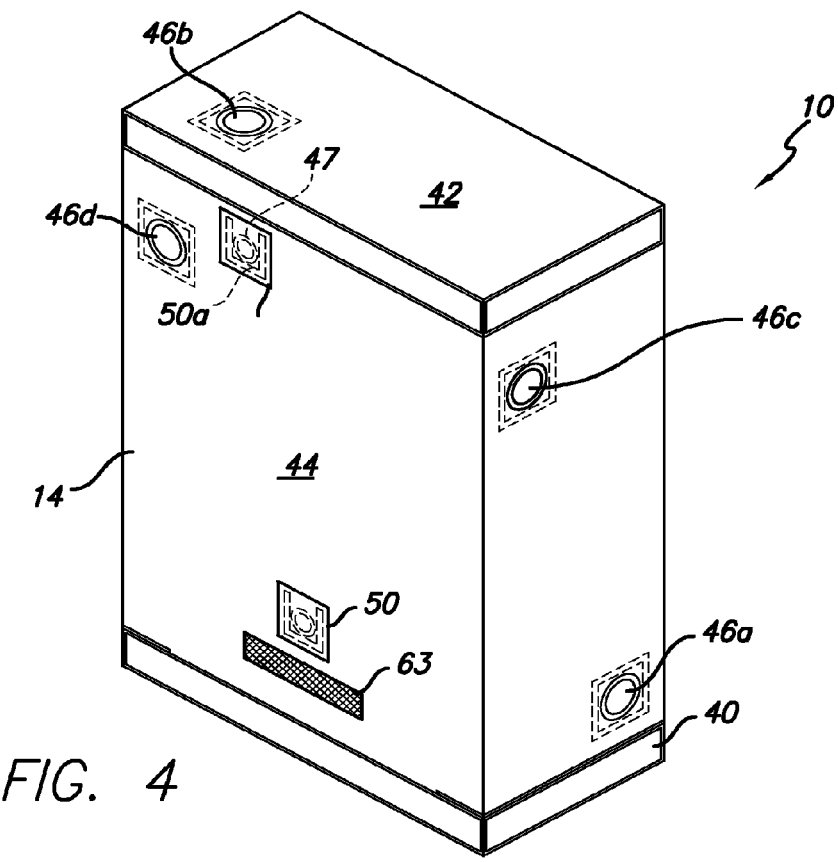
FIG. 4 is a perspective view of the back and side of the indoor greenhouse of FIG. 1.

As shown in FIGS. 1 and 4, the outer layer 14 is preferably comprised of a flexible material, such as canvas or the like that overlays the rack unit 12. In a preferred embodiment, the outer layer 14 includes canvas on outside with a thick layer of plastic thermally adhered on the inside. The outer layer 14 preferably includes bottom 40, a top 42 and an intermediate portion 44 extending therebetween that correspond to the similarly named portions of the rack unit 12. The outer layer 14 can be a single piece or a plurality of pieces that are sewn, stitched or otherwise held together.

Figure 7:
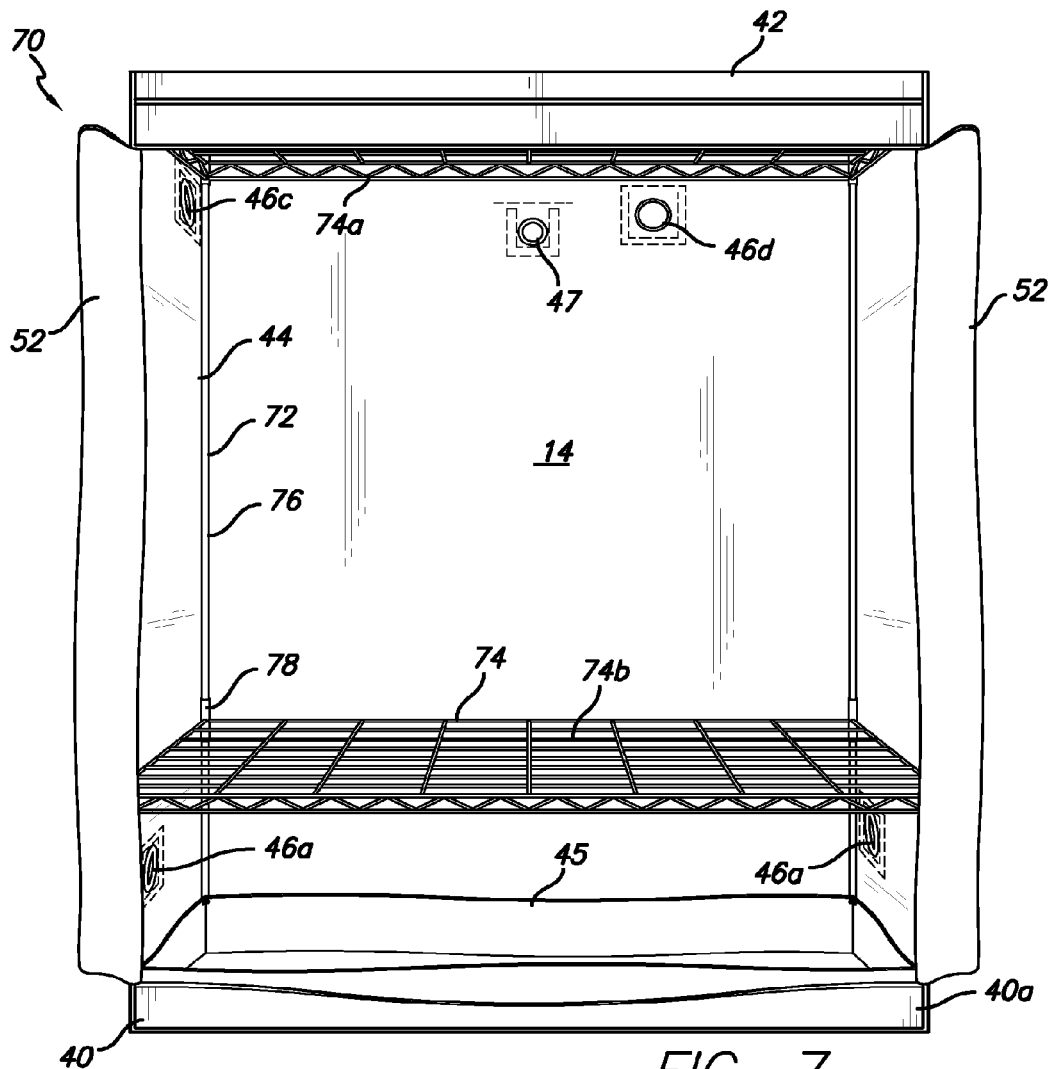
FIG. 7 is a front elevational view of an indoor greenhouse with the front flaps open in accordance with a second preferred embodiment of the present invention.

As shown in FIG. 1, the bottom 40 preferably includes a front lip 40a for preventing water or other things from spilling out from the floor of the greenhouse 10. In a preferred embodiment, the greenhouse 10 includes a separate waterproof floor 45 (see FIG. 7) that is placed on the bottom 40 of the outer layer 14. The waterproof floor can be secured in place using plastic tie wraps or the like that are wrapped around the poles 24 and through grommeted openings in the waterproof floor.

The outer layer 14 also preferably includes a plurality of openings 46 therein. The openings 46 can be used for ventilation, ducting and for the ingress and egress of electrical cords and the like. In a preferred embodiment, the greenhouse includes two vent openings for venting fresh air into and out of the greenhouse 10. These are labeled as intake vent opening 46a and exhaust vent opening 46b. In a preferred embodiment, the greenhouse also includes two light cooling openings for moving air into and out of the lighting system to cool the lights. These are labeled as intake light cooling opening 46c and exhaust light cooling opening 46d. However, the greenhouse may have more than two of each of the openings 46.

As shown in FIGS. 1-2, the openings 46 can include duct connection members 48 for connecting ducts thereto. The duct connection members 48 include a main body portion 49 and a connecting ring 54. The main body portion 49 comprises an integral tube portion 49a and connecting ring 49b. In a preferred embodiment, the tube portion 49a is inserted through one of the openings 46 until the connecting ring 49b is adjacent the outer layer 14. Then the other connecting ring 54 is placed over the tube portion 49a until it is adjacent the outer layer 14 on the opposite side as connecting ring 54. The two connecting rings 49b and 54 are then secured together through the outer layer, for example by nuts and bolts, rivets, adhesive or the like. Ducting 60 can then be secured to the tube using a hose clamp 51 or the like (see FIG. 5). In another embodiment, a double duct connection member can be created by using two main body portions 49 that are placed back to back on opposite sides of the outer layer 14 (and the connecting rings 49b being connected to each other). This will allow ducting to be connected on both sides of the outer layer 14.

These openings 46 can be used as desired (or interchangeably) to move air into and out of the greenhouse both for cooling a lighting system and/or to ventilate the inside of the greenhouse separately or independently to help grow any plants therein, while maintaining a proper ambient temperature and humidity.

Figure 5:
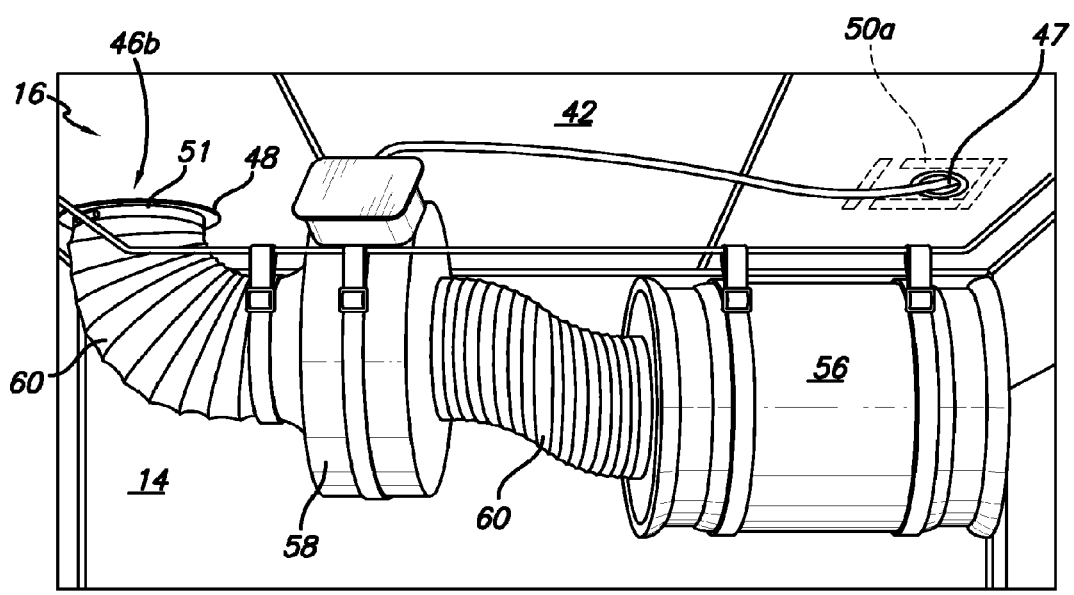
FIG. 5 is a front elevational view of the ventilation system of the indoor greenhouse of FIG. 1.

The outer layer 14 also preferably includes at least one opening 47 for electrical cords (see FIG. 5). In a preferred embodiment, opening 47 includes a flap 50 with Velcro 50a on both the flap and outer layer 14 for keeping moisture, light or other matter from getting into the greenhouse 10. The flaps 50 are preferably light tight.

The front part of the intermediate portion 44 of the outer layer 14 preferably includes doors 52 for allowing entry to the greenhouse 10. The doors 52 can include a zipper, Velcro, snaps, hooks, a combination of these or other means for closing the greenhouse 10 when desired.

As shown in FIG. 5, the greenhouse 10 preferably includes a ventilation system 16 for helping move air through the interior of the greenhouse 10 and out exhaust vent opening 46b. In an exemplary embodiment, the ventilation system 16 includes a filter 56, such as a charcoal carbon filter, a centrifugal fan 58 or the like, as well as ducting 60 for directing the air as desired. The filter 56 and fan 58 can be held in place by straps (as shown in FIG. 5), hooks, clamps or the like. The fan 58 causes air to be sucked through the filter 56, into the ducting and through the fan 58 and out exhaust vent opening 46b.

The action of fan 58 also causes air to be sucked in through intake vent opening 46a and then causes the air to rise through the greenhouse and over any plants therein (the heat from the light 100 also causes the air to rise). Arrow A1 in FIG. 1 shows the general path of the air as it enters and exits the greenhouse. In another embodiment, the greenhouse can include ducting on the outside of intake vent opening 46a that pumps air into the greenhouse. The advantageous placement of intake vent opening 46a toward the bottom of the greenhouse 10 and the placement of exhaust vent opening 46b near the top of the greenhouse 10 provides for optimum movement of air (see arrow A1) over the plants in the greenhouse.

Figure 6:
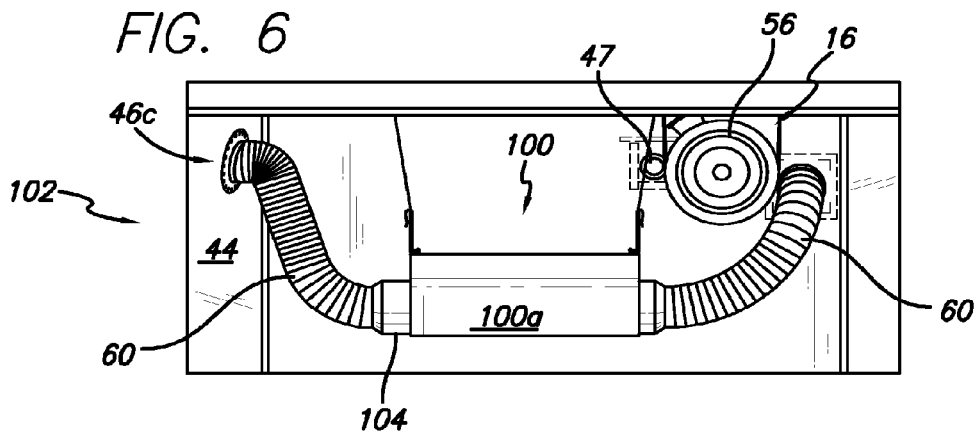
FIG. 6 is a partial front elevational view of an indoor greenhouse having a light and cooling system.

As shown in FIG. 6, the greenhouse also preferably includes a light or lights 100 and a cooling system 102. The type of light used is not a limitation on the present invention. However, high pressure sodium, metal halide or fluorescent or examples of types of lights that can be used. The cooling system 102 includes ducting 60 that extends between the light 100 (or lights) and the light cooling openings 46b and an exhaust fan 104 for helping move the air into and out of the openings 46b and the ducting 60. In a preferred embodiment, the lights 100 are contained in an enclosure 100a that is part of the path for moving the air from the intake opening 46b, through one duct 60, through or over the lights (through the enclosure 100a), through the other duct 60 and out through exhaust fan 104 and opening 46b. The inclusion of four different ductable openings (two for moving fresh air through the greenhouse and two for cooling the lighting system) is advantageous.

As shown in FIG. 1, the outer layer 14 preferably includes a passive air vent 62 that includes a cover 62a and a plastic mesh grill 63. This vent 62 helps regulate the pressure inside the greenhouse 10, by opening or closing when the pressure is too great or too little. This prevents the outer layer 14 from sucking in or bulging out.

Referring to FIGS. 7-9A, generally, a second preferred embodiment of an indoor greenhouse 70 includes a rack unit 72, an outer layer 14 and a ventilation system 16. The rack unit 72 differs from the rack unit 12 described above with the first preferred embodiment greenhouse 10. However, the outer layer 14, ventilation system 16 and other components are similar to those of the greenhouse 10.

Figure 8:
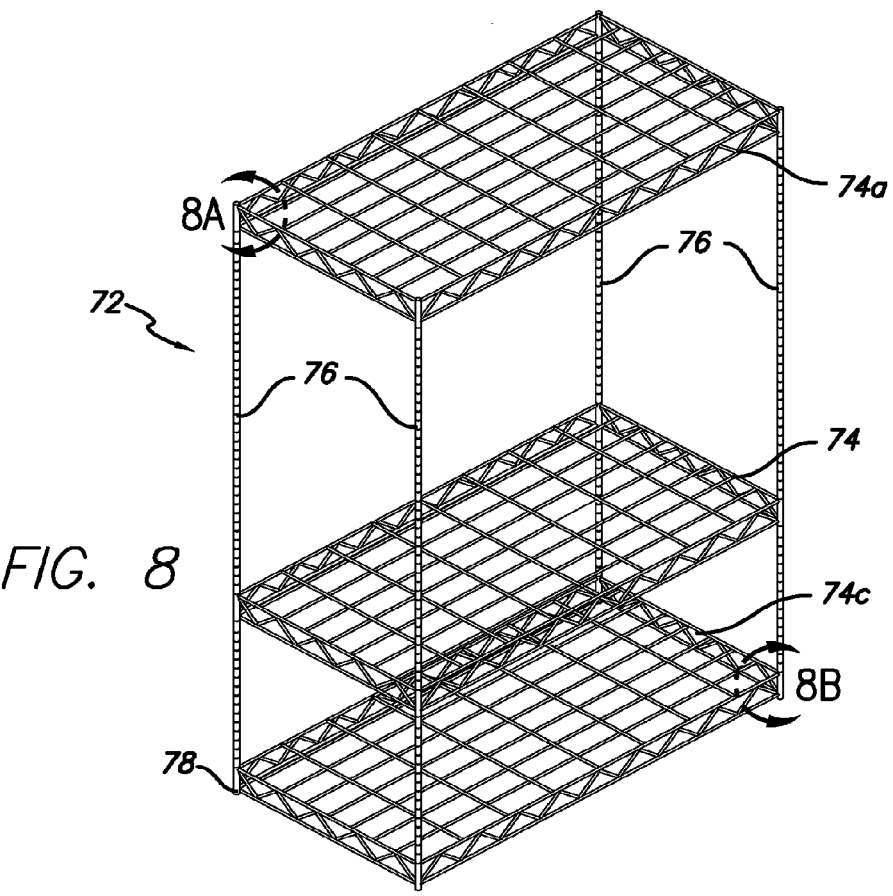
FIG. 8 is a perspective view of the rack unit of the indoor greenhouse of FIG. 7.
Figure 8A:
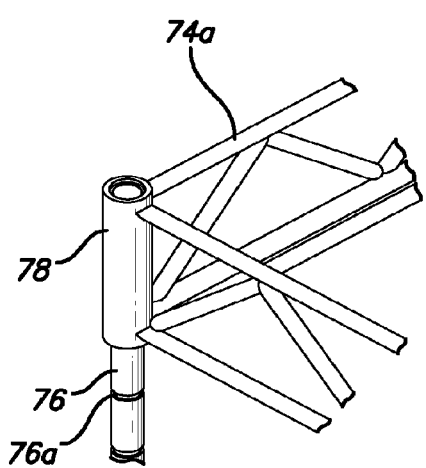
FIG. 8A is a detailed perspective view showing an upper corner of the rack unit of the indoor greenhouse of FIG. 7.
Figure 8B:
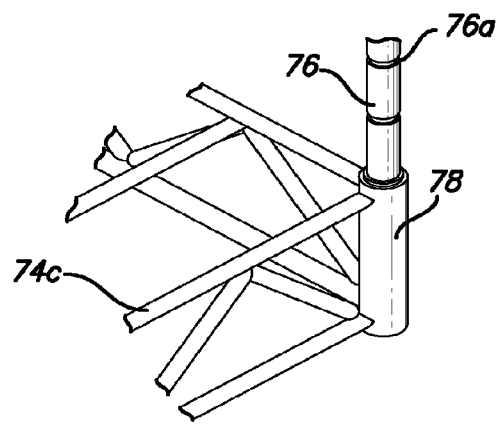
FIG. 8B is a detailed perspective view showing a lower corner of the rack unit of the indoor greenhouse of FIG. 7.
Figures 9, 9A:
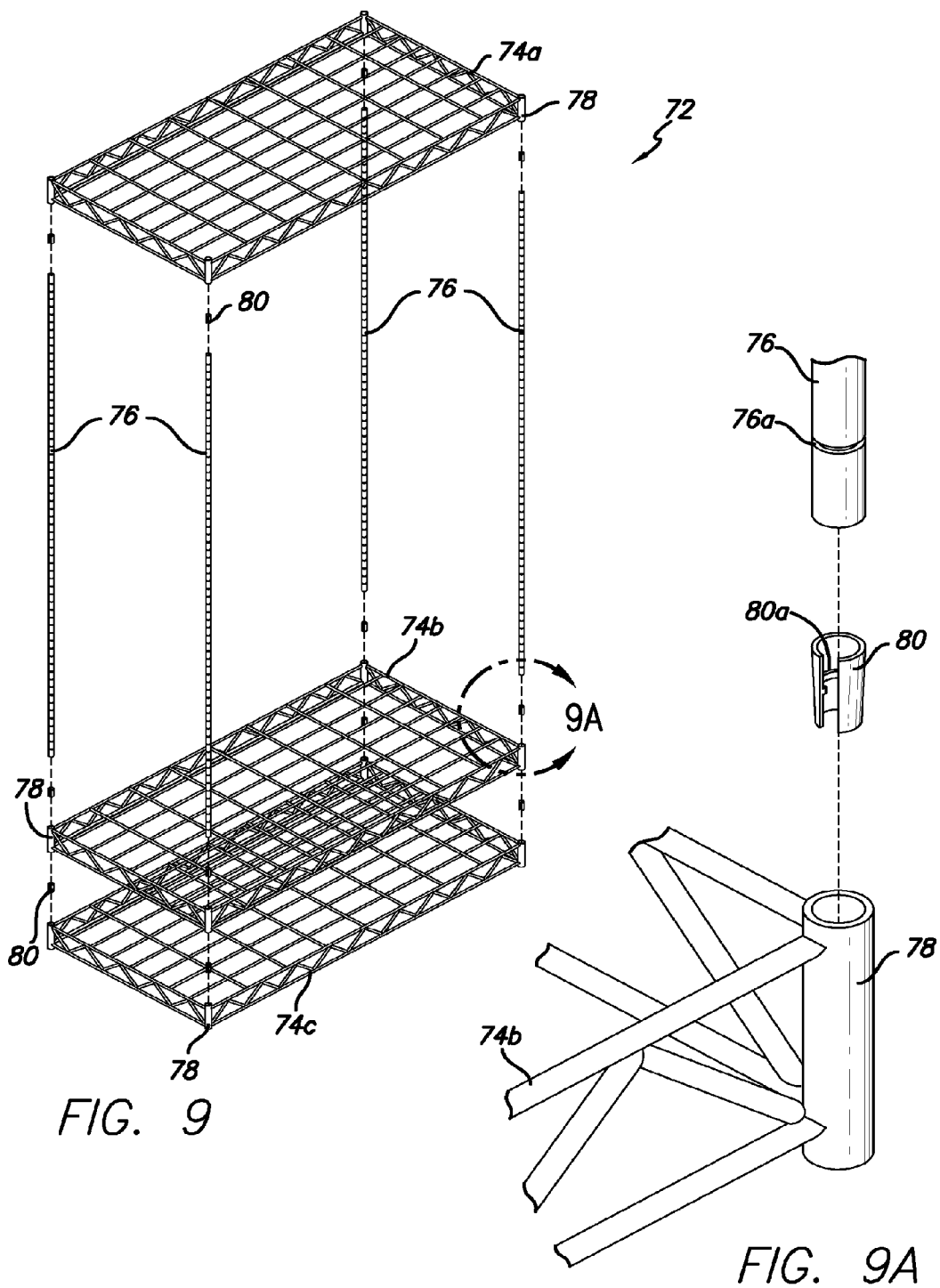
FIG. 9 is an exploded perspective view of the rack unit of the indoor greenhouse of FIG. 7.
FIG. 9A is a detailed exploded perspective view showing a pole, clamp and receptacle.

The rack unit 72 includes shelves 74 and a plurality of poles 76 extending therebetween. As shown in FIG. 8, in a preferred embodiment, the rack unit 72 includes top 74a, middle 74b and bottom 74c shelves. All of the shelves 74 include receptacles 78 for receiving the poles 76. As is best shown in FIG. 9A, the rack unit 72 includes a plurality of clamps 80 that cooperate with grooves 76a in each of the poles 76. The clamps 80 include a fin 80a on the inside diameter thereof that fits into the grooves 76a. The clamps 80 are not completely circular, which defines a longitudinally oriented space 80b that allows the clamps 80 to be stretched such that the pole 76 fits through the space 80b. The clamp 80 then snaps back into place such that the fin 80a is received in a groove 76a. The clamps 80 are made of a metal or plastic, but must be elastic enough to separate at space 80b, but snap back into shape after the pole 76 has been received therein.

When a desired shelf height is chosen, the user places a clamp 80 on each pole 76 at the desired height, and a shelf 74 is slid onto the four poles 76 (by placing the poles 76 into the four corner receptacles 78) and over the clamps 80. The clamps 80 are tapered. In other words, the clamps 80 are configured such that they have a larger outer diameter at the bottom than at the top. This allows the receptacle 78 to fit over the clamp 80. However, friction then causes the clamp 80 to tighten on the pole 76 and causes the clamp 80 to lock within the receptacle 78. The outer diameter of the bottom of the clamp 80 is larger than the inner diameter of the receptacle 78, thereby creating a friction fit. In another embodiment, the clamps 80 can be comprised of two halves that are held in place by the user as the receptacle 78 is slid over it.

In the embodiment shown in the pictures, a user would first place the clamps 80 at the bottom of the poles 76 and then slide the bottom shelf 74*c* on. They then would place the clamps 80 at a point in near the middle of the poles 76 and slide the middle shelf 76*b* on and then would place the clamps 80 at the top of the poles 76 and then slide the top shelf 74*a* on. It will be understood that any number and any configuration of shelves 74 is within the scope of the present invention.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. A method comprising the steps of:
providing an indoor greenhouse that includes
    a rack unit that includes a top, a bottom, and an intermediate portion extending therebetween, and
    an outer layer that at least partially surrounds the rack unit and defines a greenhouse interior, wherein the outer layer includes a top, a bottom, and an intermediate portion extending therebetween that correspond to the top, bottom, and intermediate portion of the rack unit, and wherein the outer layer has intake and exhaust light cooling openings defined therein,
placing a light at least partially surrounded by a light enclosure in the greenhouse interior,
placing a cooling system in the greenhouse interior, wherein the cooling system includes first and second ducts and a first fan, and
arranging the cooling system to define an air path to allow air to travel through the first and second ducts, the first fan, the light enclosure and between the intake and exhaust light cooling openings.

\* \* \* \* \*